(12) United States Patent
Chao et al.

(10) Patent No.: US 10,356,020 B2
(45) Date of Patent: Jul. 16, 2019

(54) CUSTOM SHARE SHEET WITH SHORTCUT CONTROLS TO SHARE A CONTENT ITEM

(71) Applicant: Dropbox, Inc., San Francisco, CA (US)

(72) Inventors: Ed Chao, Mountain View, CA (US); Riley Avron, San Francisco, CA (US); Filip Borowiec, Warsaw (PL)

(73) Assignee: Dropbox, Inc., San Francisco, CA (US)

( * ) Notice: Subject to any disclaimer, the term of this patent is extended or adjusted under 35 U.S.C. 154(b) by 57 days.

(21) Appl. No.: 15/056,726

(22) Filed: Feb. 29, 2016

(65) Prior Publication Data

US 2017/0250940 A1 Aug. 31, 2017

(51) Int. Cl.
*H04L 12/58* (2006.01)
*H04L 29/08* (2006.01)
*G06F 16/955* (2019.01)
*G06F 16/176* (2019.01)

(52) U.S. Cl.
CPC .......... *H04L 51/046* (2013.01); *G06F 16/176* (2019.01); *G06F 16/9562* (2019.01); *H04L 51/18* (2013.01); *H04L 67/22* (2013.01)

(58) Field of Classification Search
CPC ......... H04L 51/18; H04L 51/32; H04L 51/38; H04L 51/046; H04L 67/22; G06F 16/9562; G06F 16/176
See application file for complete search history.

(56) References Cited

U.S. PATENT DOCUMENTS

| 8,532,637 | B2 | 9/2013 | Abolrous et al. |
| 8,707,184 | B2 | 4/2014 | Chen et al. |
| 8,799,374 | B2 | 8/2014 | Sharma |
| 8,923,491 | B2 | 12/2014 | MacWan |
| 2009/0234876 | A1* | 9/2009 | Schigel ............ G06F 17/30873 |

(Continued)

OTHER PUBLICATIONS

Shami, et al., "Browse and Discover: Social File Sharing in the Enterprise", CSCW datedf 2011, Mar. 19-23, 2011, Hangzhou, China, 10 pages.

(Continued)

*Primary Examiner* — Abdulkader M Alriyashi
(74) *Attorney, Agent, or Firm* — Hickman Palermo Becker Bingham LLP

(57) ABSTRACT

Techniques are described herein to generate a custom share sheet. The custom share sheet comprises one or more shortcut controls to share a content item using one or more corresponding contact-avenue pairs. A contact-avenue pair includes a link sharing mechanism and contact information for one or more recipients within the application or application protocol that uses the link sharing mechanism. The contact-avenue pairs are generated based on the share history of the particular user sharing the content item. Shortcut controls to sharing a Content Item Are primarily generated based on local share history. These shortcut controls are ordered based on contact-avenue pairs that were most recently used to share a content item. Shortcut controls to sharing a Content Item Are secondarily generated based on cross-platform share history derived from content items stored in cloud storage. These shortcut controls are ordered based on contact-avenue pairs that were used to share the most content items.

17 Claims, 10 Drawing Sheets

(56) References Cited

U.S. PATENT DOCUMENTS

| | | | |
|---|---|---|---|
| 2015/0081783 A1* | 3/2015 | Gong | H04L 65/60 |
| | | | 709/204 |
| 2015/0200878 A1* | 7/2015 | Shih | H04L 51/046 |
| | | | 709/206 |
| 2017/0093780 A1* | 3/2017 | Lieb | G06F 17/30265 |

OTHER PUBLICATIONS

Bernstein et al., "Enhancing Directed Content Sharing on the Web", CHI 2010, Apr. 10-15, 2010, Atlanta, Georgia, USA, 11 pages.

* cited by examiner

Local Share History 222

| Time | Contact | Avenue | Content Items |
|---|---|---|---|
| T5 | username3 | FB messenger | C, A |
| T10 | username2 | Facebook | B |
| T15 | 555-1234 | text message | A |

Global Share History 224

| Counts | Contact | Avenue | Content Items |
|---|---|---|---|
| 3 | user4@mail.com | email | A, B, C |
| 2 | user5@mail.com | email | A, B |
| 2 | user2@mail.com | email | B, C |
| 1 | user6@mail.com | email | C |
| 1 | user7@mail.com | email | B |
| 1 | user8@mail.com | email | B |

FIG. 2B

CUSTOM SHARE SHEET WITH SHORTCUT CONTROLS TO SHARE A CONTENT ITEM

FIELD OF THE INVENTION

The present invention relates to techniques for sharing content items, and more specifically to improved computer-implemented techniques to generate a custom share sheet.

BACKGROUND

Today, content items are often "shared" rather than sent directly from one computer to another computer. In some cases, a content item is shared by storing the content item in cloud storage and providing one or more recipients with a link to download, view, or edit the content item. In some cases, a sharing user of a client device can choose a program by which to share a content item by opening a "share sheet" of recommended applications that can be used to send the link. These applications are selected from a group of applications that are already loaded onto the sharing user's client device.

Various applications have been configured to receive links from sharing users in different ways. For example, some social media applications are configured to provide a recipient with a preview of the linked content item's contents by pre-caching some of the file's contents before the user accesses the file from cloud storage. This allows the recipient to read the title of the file and some content before deciding to access the shared file. Other applications provide a simple user interface that recognizes that a link has been received, and highlight the link to indicate that selecting the link opens the linked file in a local browser when it is clicked.

Different applications provide different benefits based on their complexity or simplicity. As a result, different users prefer different methods of receiving these links to content items. For example, some users prefer receiving links passively by viewing data posted by the sharing user as it appears in the recipient's feed in a social media application. Other users prefer to receive links to content items more directly by receiving the link through instant message, text message or email. Sharing the same content item with multiple recipients through their preferred application for receiving the link can be a time consuming endeavor.

One approach to sharing the same content item with multiple friends includes tagging people as part of a group, and then offering an option to share the content item with everyone in that group. For example, a user may wish to share a photo with only the people tagged as friends. At the time a user wishes to share a link, the user is given the option to share with friends, family, or everyone. The user selects the group "friends" and sends the link to the different feeds of the individual users in that group. Unfortunately, this approach limits the application in which a user can share with those people. For example, a user using Facebook® that chooses to share a photo with friends may only share with friends that also have Facebook accounts. An additional limitation is that the people in the particular group need to be tagged as friends prior to sending the photo to the group.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2B is a block diagram illustrating metadata saved as part of a user's sharing history;

DETAILED DESCRIPTION

Figure 1:
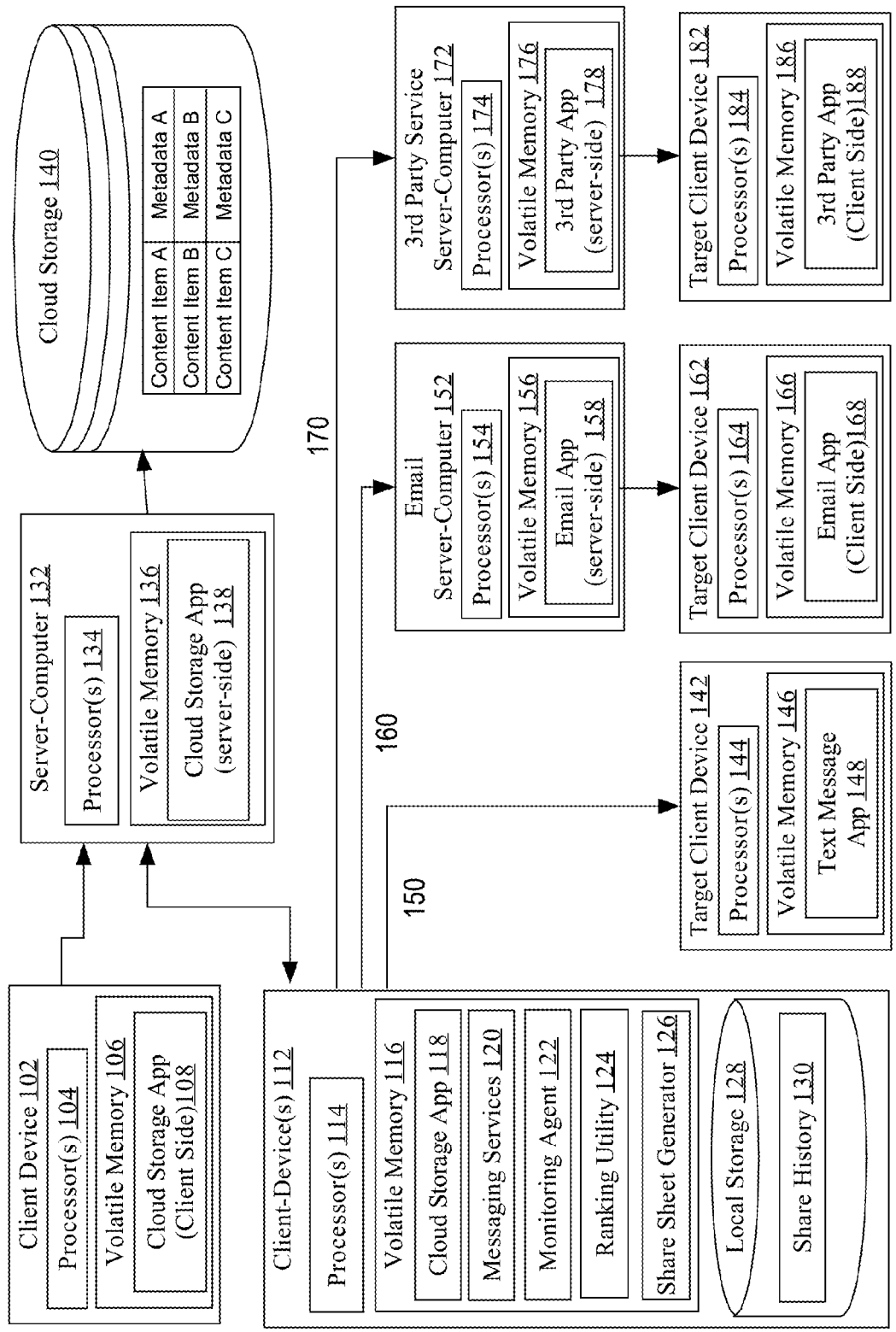
FIG. 1 is a block diagram illustrating an example system architecture configured to share content items through a client computer.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for generating a custom share sheet. A share sheet is a graphic user interface that provides controls for sharing a content item. The custom share sheet comprises one or more shortcut controls to share a content item (e.g., a file) using one or more corresponding contact-avenue pairs. A contact-avenue pair includes a link sharing mechanism and contact information for one or more recipients within the application or application protocol that uses the link sharing mechanism.

According to one embodiment, the contact-avenue pairs are generated based on the share history of the particular user sharing the content item. Shortcut controls to sharing a content item may be generated based on local share history. These shortcut controls may be ordered based on the contact-avenue pairs that were most recently used to share a content item. Shortcut controls to sharing a content item may be secondarily generated based on cross-platform share history derived from content items stored in cloud storage. These shortcut controls may be ordered based on contact-avenue pairs that were used to share the most content items.

According to various embodiments, the generated share sheet improves a user's ability to interface with a client device in at least three ways. First, the user is provided, in a single screen, a control to select a contact and an avenue for sharing a content item via a link. In contrast to a traditional screen-by-screen serialized approach, the selection control allows a sharing user to perform user and avenue selection concurrently. Secondly, the user is provided a control to select multiple contacts to share the link or content item with through multiple different avenues. Thus, a user can select a content item to share, and then select multiple recipients in different avenues in parallel rather than selecting a content item to share, selecting a first application, inputting a first contact address within that first application, and then selecting the same Content Item Again to share, selecting a second application, and inputting a second contact address within that second application.

Thirdly, the user is provided a one action per contact control for sharing a content item using a touch screen device. Traditionally, with conventional share screens, a user would be required to search for a contact address of a recipient in a first program-flow, and then input that contact address using an on-screen keyboard in a second program flow. According to some embodiments of the present invention, by providing contact-avenue pairs that are selectable, the user is given both (a) information necessary to share a content item, and (b) the ability to quickly input that information in a single screen with a single action per share. An effect of being provided with shortcut controls to contact-avenue pairs in which to share is that the user is able to interact with the mobile device more efficiently.

These and other embodiments will now be described in greater detail below with respect to the Drawings.

System Overview

Referring to FIG. 1, it is a block diagram that depicts a system configured to share content items through a client computer. The cloud sharing system 100 comprises client devices 102, 112; server computer(s) 132; cloud storage 140; an email server computer 152; third party server computer(s) 172; and target client devices 142, 162, and 182.

In the embodiment illustrated in FIG. 1, servers and client devices 102, 112, 132, 142, 152, 162, 172, 182 comprise one or more processors 104, 114, 134, 144, 154, 164, 174, 184, and volatile memory 106, 116, 136, 146, 156, 166, 176, 186.

Client devices 102, 112 are executing a cloud storage application 108, 118 on the client side, while the server computer 132 is executing a cloud storage application 128 on the server side. The continuous operation of server computer 132 along with cloud storage 140 allows a particular user to access cloud storage 140 with either client device 102 or 112 using one or more identifiers to identify the particular user account associated with the particular user.

The client devices 102, 112 may be implemented as a general purpose computers or as a mobile device with specialized hardware such as a touch screen. Cloud storage application 108, 118 may have different versions for different operating systems and different hardware components in client devices 102, 112.

Server computers 132, 152, and 172 may each be one computer, multiple computers in a cluster, or a collection of computers specialized towards different tasks. For example, server computer 132 may primarily be running a cloud storage application 138, while another computer (not shown) is configured to operate as an email server that sends confirmation emails to client devices. Cloud storage application 138 generates and sends messages to the email server that forwards the message as an email to one or more target email addresses.

Each computer has processors and volatile memory that work in conjunction to execute one or more specific applications. Some of these applications are web applications. The client side of a web application (108, 118, some services 120, 168, 188) provides a front-end interface to generate and encode requests to send to the server side. The server side of the web application (138, 158, 178) provides a back-end to process these requests and to generate and serve data to the corresponding front-end based on the permissions and requests received. The client-side of each web application may be configured to run in a web browser or as standalone program.

Messaging Services

Client device 112 executes a plurality of messaging services 120. These messaging services provide link sharing mechanisms that allow a sharing user to send a link. The target client devices 142, 162, 182 each run at least one corresponding messaging service (applications 148, 168, and 188, respectively) for one of the plurality of messaging services 120 in client device 112.

Target client device 142 runs a text messaging application 148.

Target client device 162 runs an email application 168.

Target client device 182 runs a third party application 188 such as a social media web application or instant messaging application.

In addition to sending text and/or content items through the messaging service. The messaging service may also receive links to one or more content items in cloud storage 140. Sending a link to a content item through a specific messaging service application is referred to herein as sending through an "avenue."

Avenues of Sharing

An avenue comprises a link sharing mechanism implemented as part of the cloud storage application or another application. The link sharing mechanism is implemented by calling an application programming interface (API) for an application, and sending the link through that application.

Avenue 150 is sending a link through a text message with a text message client in messaging services 120 to one or more phone numbers.

Avenue 160 is sending a link through email with an email client in messaging services 120 to one or more email addresses.

Avenue 170 is sending a link through one or more third party applications in messaging services 120 to an account associated with one of the third party applications.

In the case of an email, the avenue need not include a particular email client to send the email; instead, the avenue may only comprise the SMTP protocol. Any application executing on the client device may call an API for a default email client to send the link via email. Similarly, in the case of instant messaging the avenue need not include a particular text messaging application. Other avenues that may defined by a protocol rather than application include, but are not limited to, Bluetooth, copy to clipboard, near field communication (such as Android Beam or tapping mobile devices together to share a content item), infrared communication, or any combination thereof.

Avenues Through the Cloud Storage Server Computer

An alternative to having the client send messages directly to target client devices is sharing through the server computer 132. An avenue through server computer 132 may include providing users of the cloud storage application, other than the sharing user, access to a content item in cloud storage 140 using the cloud storage application 138 alone.

Additionally, server computer 132 may include a transport interface (not shown) that provides for sending a link through one or more protocols, APIs, or other applications. Each messaging service may have an individual plugin that may be loaded by the transport interface to communicate data through a particular protocol, API or application.

If the recipients would like to communicate back with the sharing user, the server may act as an intermediary that performs cross-protocol messaging. For example, if a recipient on target client 142 receives a text message via SMS and a recipient on target client 152 receives an email via SMTP, both recipients can communicate back with the sharing user of client device 112. The server computer 132 includes a transport interface that translates the return messages into messages that are readable through the cloud storage application 118 rather than requiring the client to open different messaging services 120 to read the return messages.

Avenues Through Third Party Servers

As previously stated, an avenue also includes a path through third party applications. These third party applications typically include their own servers that act as an intermediary between users. For example, sharing a content item through a third party application such as Facebook® is an avenue that may include a third party server computer 172. Other example third party applications that may be used to share a content item through a third party server include, but are not limited to, Twitter, Pinterest, Facebook, Google Drive, Gmail, Google+, Google Hangouts, Facebook messenger, Google Translate, WeChat, Yelp, Snapchat, and Slack.

Unlike with emails and text messages, third party avenues need not be associated with a particular recipient. For example, an avenue may include sharing a link on a logged in user's wall. Thus, the third party server can store the message to the link for any length of time before a recipient logs in to the third party application using a target client device and views the link.

Cloud Storage Application

In a preferred embodiment, a cloud storage application allows a user of a client device to select a content item from the client device and upload the content item to cloud storage. A user can upload a content item from different client devices to cloud storage for the same user account. For example, a particular user uploads, from client device 102 to server computer 132, Content Item A to store Content Item A in cloud storage 140 as associated with the particular user's account. The particular user also uploads, from client device 112 to server computer 132, Content Item B and Content Item C to store these content items in cloud storage 140 as associated with the particular user's account.

Uploaded content items may then be shared by sending links to the content items through a messaging service. Any client can share a content item that has been uploaded to cloud storage 140. For example, the particular user may use client device 112 to share Content Item A, Content Item B, and Content Item C. The particular user may also use client device 102 to share Content Item A, Content Item B, and Content Item C. A client device may be limited to avenues of sharing through applications that are already loaded onto that particular device.

Cloud Storage Metadata

Each time a content item is shared through a client device, metadata regarding the shared data may be uploaded to cloud storage 140. Saving this data may serve multiple purposes. First, metadata regarding avenues of sharing, contacts, content, and timestamps may be used to recommend sharing avenues for the user on any platform associated with the user's account. For example, recent shares may be used to order avenue recommendations cross-platform. Secondly, the stored metadata may indexed, allowing a sharing user to search and sort content items by when they were made available to the recipients so they may be downloaded at a later date.

The cloud storage application 138 generates metadata for a given content item in cloud storage 140 when the given content item is shared. For example, if a user shares Content Item A with an email address either through cloud storage application 108 or 118, an indication of the account that has access to Content Item A is sent to the server side of the cloud storage application 138. The cloud storage application 138 may then generate metadata regarding which user account or email address has been given permissions over the Content Item A. The metadata may further comprise the time in which the permissions were given, the type of permissions, the type of content item, content of the content item, or other metadata regarding Content Item A such as a message that was sent or the client device that was used to share the content item.

Capabilities of Different Client Devices

Although any client device that is running the cloud storage application on the client side may upload or share a content item, the cloud storage application running on the client side may have different versions depending on the operating system of the client device and the depending on if the client device has specialized hardware such as a touch screen. For example, client device 102 is a general purpose computer with standard mouse and keyboard inputs and a Windows operating system. The version of cloud storage application 108 running on client device 102 provides for uploading and sharing content items, but client device 102 does not include a monitoring agent, a ranking utility or a share sheet generator. When Content Item C is shared by client device 102, metadata regarding Content Item C is stored with Content Item C in cloud storage 140, but not necessarily in client device 102. In contrast, the version of cloud storage application 118 running on client device 112 provides for uploading and sharing content items, and the client device 112 includes a monitoring agent 122, a ranking utility 124 and a share sheet generator 126. When Content items A, B, and C are shared by cloud storage application 118, these programs may be invoked.

Client Side Monitoring Agent

Without affecting how a user shares data, a client side monitoring agent collects metadata about when and how data is shared. The monitoring agent 122 may be implemented as a standalone program, an extension or plugin for a particular application or browser, or an extension of the operating system. In a preferred embodiment, the monitoring agent 122 executes as part of the web application that provides for content item sharing.

In some embodiments, the monitoring agent may be configured to monitor a sharing interface built as an extension for the iOSv8 operating system or later. In some embodiments, the monitoring agent may be configured to monitor a sharing interface built as extension for the Android Lollipop v5.0 operating system or later. Additionally, the monitoring agent may be configured to monitor sharing implemented through specific applications such as the cloud storage application 118 or messaging services 120. The client side monitoring agent 122 may capture metadata of when the share occurred, the application that was used to share the data, and the contact or account that received the share.

A. Monitoring Local Share History

The monitoring agent 122 generates a record in share history 130 when a particular user that is logged into cloud storage application 118 shares a content item from cloud storage 140 with a target client device. For example, the particular user may share a first link with target client 142 at a first time through text message avenue 150. The monitoring agent 122 creates a record in local share history 130 that includes a first timestamp, the text message avenue 150, and a phone number that received the text message associated with target client device 142. The record may further comprise one or more identifiers to identify the particular user, the particular user account, or the particular device 112 that sent the text message, a recipient, a recipient account, or a target client device 142 that received the text message, the content item type of Content Item A, an identifier of Content Item A, the content of Content Item A, and other metadata regarding Content Item A such as a message sent along with the link.

Monitoring agent 122 generates another record in share history 130 when the particular user that is logged into cloud storage application 118 shares Content Item B with a different target client device 162. The monitoring agent 122 creates a record in share history 130 that includes a second timestamp, the email avenue 160, and an email address associated with a recipient that received the email. This record may also comprise additional information as with Content Item A, but regarding Content Item B instead such as one or more identifiers to identify the particular user, the particular user account, or the particular device 112 that sent the email, a recipient, a recipient account, or a target client device 162 that received the email, the content item type of Content Item B, an identifier of Content Item B, the content of Content Item B, and other metadata regarding Content Item B such as a message sent along with the link.

Monitoring agent 122 generates another record in share history 130 when the particular user that is logged into cloud storage application 118 shares Content Item C with a different target client device 182. The monitoring agent 122 creates a record in share history 130 that includes a third timestamp, the third party service avenue 170, and a user account associated with a recipient that could have received the post. This record may also comprise additional information as with Content Item A, but regarding Content Item C instead such as one or more identifiers to identify the particular user, the particular user account, or the particular device 112 that sent the post, a recipient, a recipient account, or a target client device 182 that received the post, the content item type of Content Item C, an identifier of Content Item C, the content of Content Item C, and other metadata regarding Content Item C such as a message sent along with the link.

B. Monitoring Global Share History

The monitoring agent 122 may also be configured to request, from cloud storage application 138, metadata regarding each Content Item And folder in cloud storage 140 that is associated with the sharing user's account. Because "sharing" involves changing permissions of one or more content items in cloud storage 140, metadata may be stored in cloud storage 140 regarding the links that were shared or permissions that were granted. This metadata may be requested periodically (daily, weekly, monthly) or based on a trigger (turning on application 118, requesting to share a content item using application 118 for the first time, determining a threshold amount of share history 130 does not exist, or receiving input from a user to request the data).

Monitoring agent 122 may generate records in share history 130 by scanning the metadata received for each content item from the server side cloud storage application 138. The monitoring agent may parse what times, contacts and avenues have been used to send links to cloud storage 140 content items or folders from different client computers.

For example, assume the particular user shared Content Item C via email with another user (not shown) using cloud storage application 108 from client device 102. Metadata regarding this share is stored with Content Item C in cloud storage 140. The monitoring agent requests metadata regarding Content Item C, and parses out a fourth timestamp, the email service avenue 160, and an email address associated with a recipient that received the email. This record may also comprise additional information regarding Content Item C such as one or more identifiers to identify the particular user, the particular user account, or the particular device 102 that sent the post, a recipient, a recipient account, or a target client device that received the post, the content item type of Content Item C, an identifier of Content Item C, the content of Content Item C, and other metadata regarding Content Item C such as a message sent along with the link.

Ranking Utility

A ranking utility 124 is used to generate and to order contact-avenue pairs based on share history 130 captured by the monitoring agent 122. The ranking utility may use a combination of one or more queries or algorithms, known in the art, to pull and order contact-avenue pairs from share history 130. For example, the ranking utility may aggregate data items from records in share history 130 based on a first field and sort data items from the same records based on a second field. In a preferred embodiment, the contact-avenue pairs are first generated and ranked based on local share history, and then additional contact-avenue pairs are generated and ranked based on global share history. Giving priority to the local share history over the global share history creates a recommendation system that is tailored to the client device that is sharing the content item.

In a preferred embodiment, the contact-avenue pairs are ordered according to which target contacts have been most recently shared with using the local share history, and ordered according to which target contacts have been granted access to the most content items by the particular user using the global share history.

Alternative Orderings

In alternative embodiments, the ranking utility 124 may order the contact-avenue pairs based on other metrics. For example, the contact-avenue pairs may be ordered based on recipients that most recently accessed a content item owned by the particular user. Alternatively, the contact-avenue pairs may be ordered based on a rate of how often each recipient is given permissions to new content items over time. For example, each recipient may be given a "popularity census" once per month. The per month popularity censuses for each particular recipient may be averaged or given a weighted average weighted towards more recent months. Then ranking utility 124 orders contact-avenue pairs based on recipients that have been consistently added to new content items over a past period of months (i.e. twelve months). Using this technique, a recipient that is consistently given permissions to new content items is ranked higher than a recipient that has just been added to many content items within the past month. The same algorithm can be used which avenues are most used to share content items with each user. If an avenue is consistently used, then the avenue will rank higher than an avenue that has only recently been used for a particular recipient.

In still other embodiments, ranking utility 124 orders the contact-avenue pairs based on content of the content items being shared or metadata regarding the content being shared. For example, when the particular user chooses to share a picture or photo content item, the ranking utility 124 orders contact-avenue pairs based only on sharing history 130 for records that involve sharing JPG and GIF content item types. When the particular user chooses to share a text content item, the ranking utility 124 orders contact-avenue pairs based only on sharing history 130 for records that involve sharing .txt, .doc, .docx, or .pdf content item types. Using a content-based technique, the ranking utility 124 naturally generates a different contact-avenue pair for certain receivers based on the shared content item type. For example, John Doe normally receives links to PDFs and DOCs through email, but receives links to pictures through Facebook messenger. The content-based technique can also be directed to specific keywords in the content item or tags associated with the content item being shared. For example, content items that have the keyword "food" may typically be shared using Facebook, whereas content items that have the keyword "budget" may typically be shared using email. In this embodiment, a text search engine may be configured to keep an updated index of keyword and avenue associations.

In some embodiments, the ranking utility 124 may use two or more methods for determining how to order the contact-avenue pairs. For example, the ranking utility may use recently shared links to determine the ordering of contacts, and use the content item type to determine the avenue in which to recommend. In still other embodiments, the ranking utility may use a machine learning engine to combine the outputs of one or more recommendation algorithms. In this embodiment, the algorithm or combination of algorithms that continually rank the recommendations in a manner that most corresponds to how the sharing user most often selects generated shortcut controls to these contact-avenue pairs naturally develops over time. For example, using a popularity algorithm, a most recently shared algorithm, and a content based algorithm, the machine learning engine generates a weighted score for each contact-avenue pair based on each algorithm. Based on how the sharing user chooses to select shortcut controls to these contact-avenue pairs causes a feedback loop that allows the machine learning engine to adjust the weights given to the output of each algorithm.

Deduplication of Contact-Avenue Pairs

Using one or more of the ordering techniques described, contact-avenue pairs may be generated for the same person that received data through multiple applications. In this case, the ranking utility 124 may employ a deduplication technique by comparing a contact for a particular recipient with other contacts for that particular recipient. In one embodiment, the ranking utility 124 scans a contact repository (not shown) for each given contact of the contact-avenue pairs generated from the share history 130, and cross-references the given contact with associated contacts in the contact information repository (not shown).

A client device 112 may include one or more applications that aggregates and stores contact information of many people in a contact information repository. The contact information for a single person typically includes email and phone number. However, the contact information for the single person may also include screen names and account identifiers for various third party applications. The contact information repository (not shown) may be stored locally on the client device 112 or remotely on a server associated with the client device.

The ranking utility 124 compares the contact in the contact-avenue pair against the contact information repository to get a primary key associated with the contact. This primary key may be used to collect additional information about the contact, such as a picture or avatar of the contact, a tag line associated contact, a profile of the contact, or even an additional link to an account of the contact. Anytime a primary key is returned that is the same as a primary key that has already been returned, the second occurrence of the primary key may be removed from the recommended contact-avenue pairs. (The first occurrence will have a higher ranking in the contact-avenue pair ordering).

In an optional embodiment, de-duplication may be applied for other situations. For example, if a particular recipient has already received a link to a particular content item, the ranking utility may remove a contact-avenue pair to that particular user as a recommended shortcut control for sharing that particular content item.

Share Sheet Generator

Android Lollipop version 5.0 and iOS version 8 provide an API for generating a share sheet for any application created for those specific operating systems. A share sheet generator may be created using known techniques for other operating systems or virtual machines (such as a browser) as well. A default share sheet generated by the share sheet generator populates with applications that are currently loaded on the mobile device that can be used to share a link to a content item. This allows a user to select a particular application in a first screen and then select a contact or account within that application in a second screen.

The APIs provide for customizing the share sheet generator. In a preferred embodiment, the share sheet generator 126 is configured to generate share sheets that provide multiple shortcut controls to recommended contact-avenue pairs for sharing a content item (i.e. both an application and a contact within the application) in a single screen. The recommended contact-avenue pairs are received from the ranking utility 124.

The share sheet generator 126 generates one or more representations associated with the contact-avenue pairs received from the ranking utility 124. These representations may include text, images, sounds, vibrations, input controls, or additional functions of other applications. These representations may be based on data pulled from the share history 130 or from specific applications and services 118, 120.

The share sheet generator preferably is configured to generate shortcut controls to contact-avenue pairs in a list layout. Other embodiments of the custom share sheet include a carrousel layout or a grid layout for avenue recommendations. In still other embodiments, the share sheet generator 126 may generate recommendations that are displayed as chat heads that can be stacked like a deck of cards and swiped to a particular graphical representation presented at different points on a compass—north, northeast, east, southeast, south, southwest, west, or northwest—depending on whether the user wishes to share with a given application represented by an icon at a particular point on the compass. More than eight applications can be added by simply adding additional points to the compass visualization. Thus, twelve applications may be added by dividing three hundred sixty by twelve, and having a different graphical representation or icon of an application at each thirty degree increment. Alternatively, one of the graphical representations may provide access to an additional list icons.

In any event, the generated share sheet provides a control for selecting multiple shortcut controls to sharing a content item with contact-avenue pairs that are recommended to the particular user in a single screen. Thus, in a list display or grid display, a user may be given a control to select multiple avenues within the list before selecting a confirm button or swiping to the next screen. As another example, in a carrousel layout that rotates left to right, a user may swipe left or right to view additional avenues and swipe up to add the recommended avenue for receiving the share or, alternatively, swipe down to remove the recommended avenue from receiving the share. As another example, in a carrousel layout that rotates from top to bottom, a user may swipe up or down to view additional avenue recommendations and swipe right to add recommended avenue to a particular share or, alternatively swipe left to remove a recommended avenue from a particular share.

Implementation Example

Figure 2A:
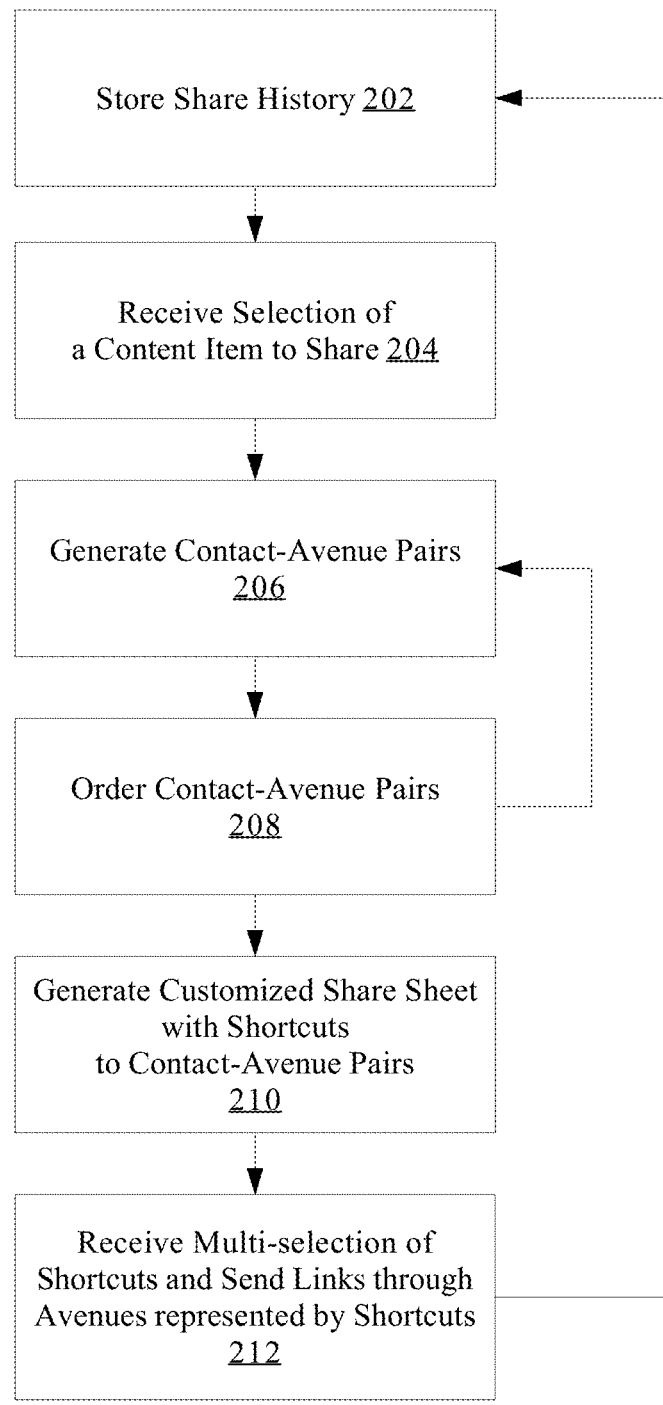
FIG. 2A is a flowchart of a program flow to send one or more links, that reference a content item, across multiple avenues of sharing.

FIG. 2A is a flowchart of a program flow to send one or more links, that reference a content item, across multiple avenues of sharing. FIG. 2A includes steps performed by client device 112 including storing share history 202, receiving a selection of a content item to share 204, generating contact-avenue pairs 206, ordering the contact-avenue pairs 208, generating a customized share sheet with shortcut controls to contact-avenue-pairs 210, receiving multi-selection of a shortcut controls and send links through avenues represented by the shortcut controls 212. FIG. 2A illustrates but one example of many possible embodiments. Other embodiments may include fewer, additional, or alternative steps, in potentially varying orders. Alternative embodiments are described more specifically herein.

At step 202, client device 112 stores local share history, while server computer 132 stores content item specific metadata that is eventually transformed into global share history. FIG. 2B is a block diagram illustrating metadata saved as part of a user's sharing history. In FIG. 2B, monitoring agent 122 has generated local share history 222, and client device 112 stores local share history 222 in local storage 128 with share history 130. The local share history 222 includes fields for the time of the share, the actual contact used, the avenue of the share and the content items that were shared. In this embodiment, the local share history 222 is stored as a table, but in alternative embodiments, the local share history may simply be stored as a log of key-value pairs. Additionally, the data items in local share history 222 are illustrated for understanding. The actual data items may include tokens or identifiers that reference times, contacts, avenues, and content items in other tables.

Selecting a Content Item to Share Example

At step 204, client device 112 receives a selection of a content item to share. A control for selecting a content item to share may be provided with the client side of the cloud storage application 118. Alternatively, the sharing control may be added as an extension of another application such as a browser or one of the messaging services 120. For example, a web browser may include a control that simultaneously uploads a content item found on the internet to cloud storage application 138 to be stored in cloud storage 140 and also generates a link for other users to view the content item from the sharing user's cloud storage 140. Example web browsers that may be extended with a "sharing" interface include Google Chrome, Internet Explorer, Firefox, Safari, or Opera.

Figure 3A:
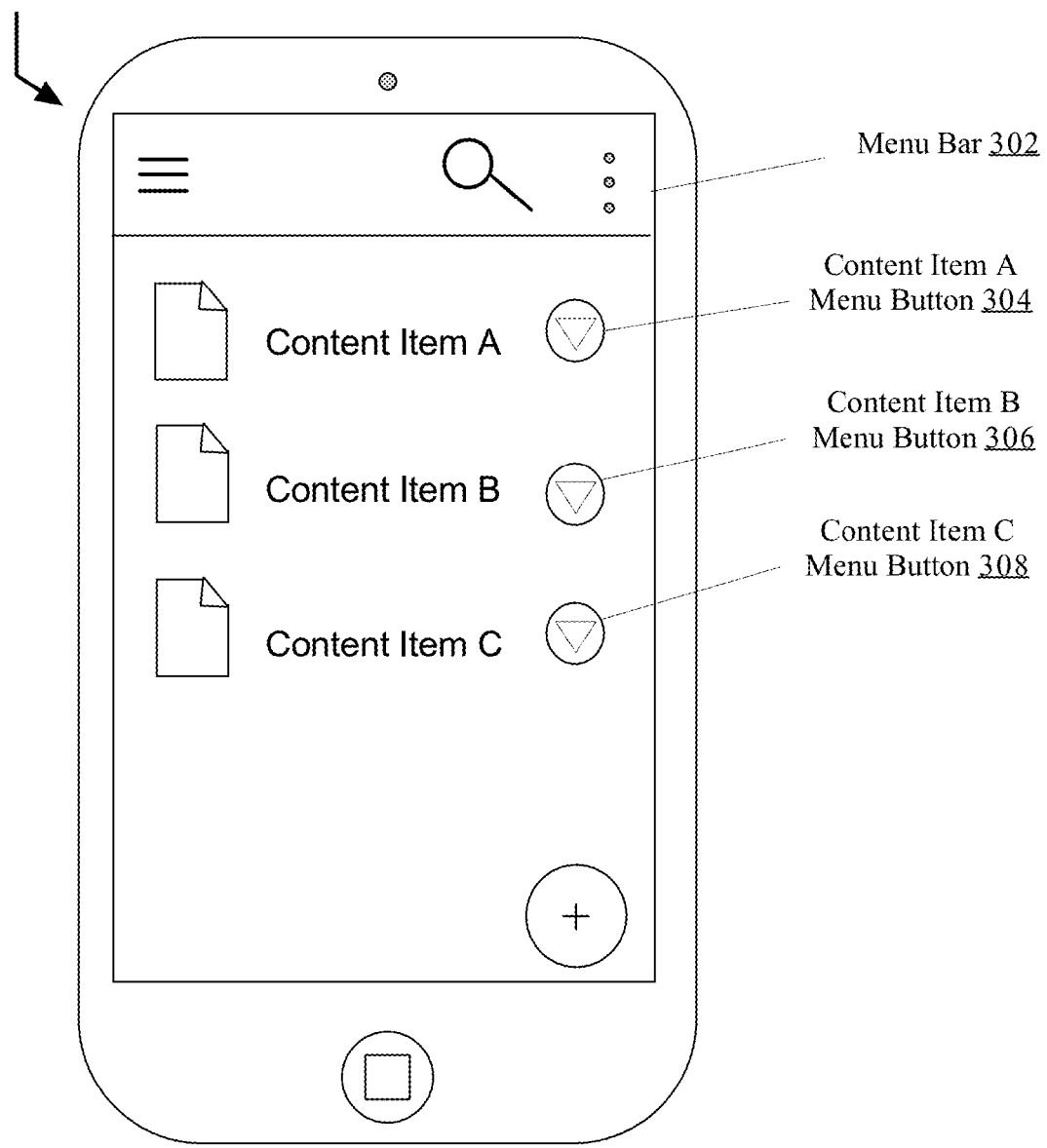
FIG. 3A is a block diagram illustrating an example user interface to select a content item.

FIG. 3A is a block diagram illustrating an example user interface to select a content item. Client device 112 is executing the client side of the cloud storage application 118. The cloud storage application provides a menu bar 302 with a hamburger menu button, a magnifying glass menu button, and a vertical ellipsis menu button. The hamburger menu button opens a menu to select categories of content items such as all content items, all photos, all offline content items, and all content items with special notifications. The magnifying glass menu button opens a search interface to search for specific content items or folders. The vertical ellipsis button opens a menu to sort or refresh the currently viewed content items and folders.

In FIG. 3A, a user has narrowed down possible content items to share using menu bar 302. The three content items are CONTENT ITEM A, CONTENT ITEM B, and CONTENT ITEM C. Each content item has a content item specific menu button 304, 306, 308 on the right hand side. A user may select one or more of these content item specific menu buttons 304, 306, 308 to perform a specific action, such as sharing, on the corresponding content item.

Figure 3B:
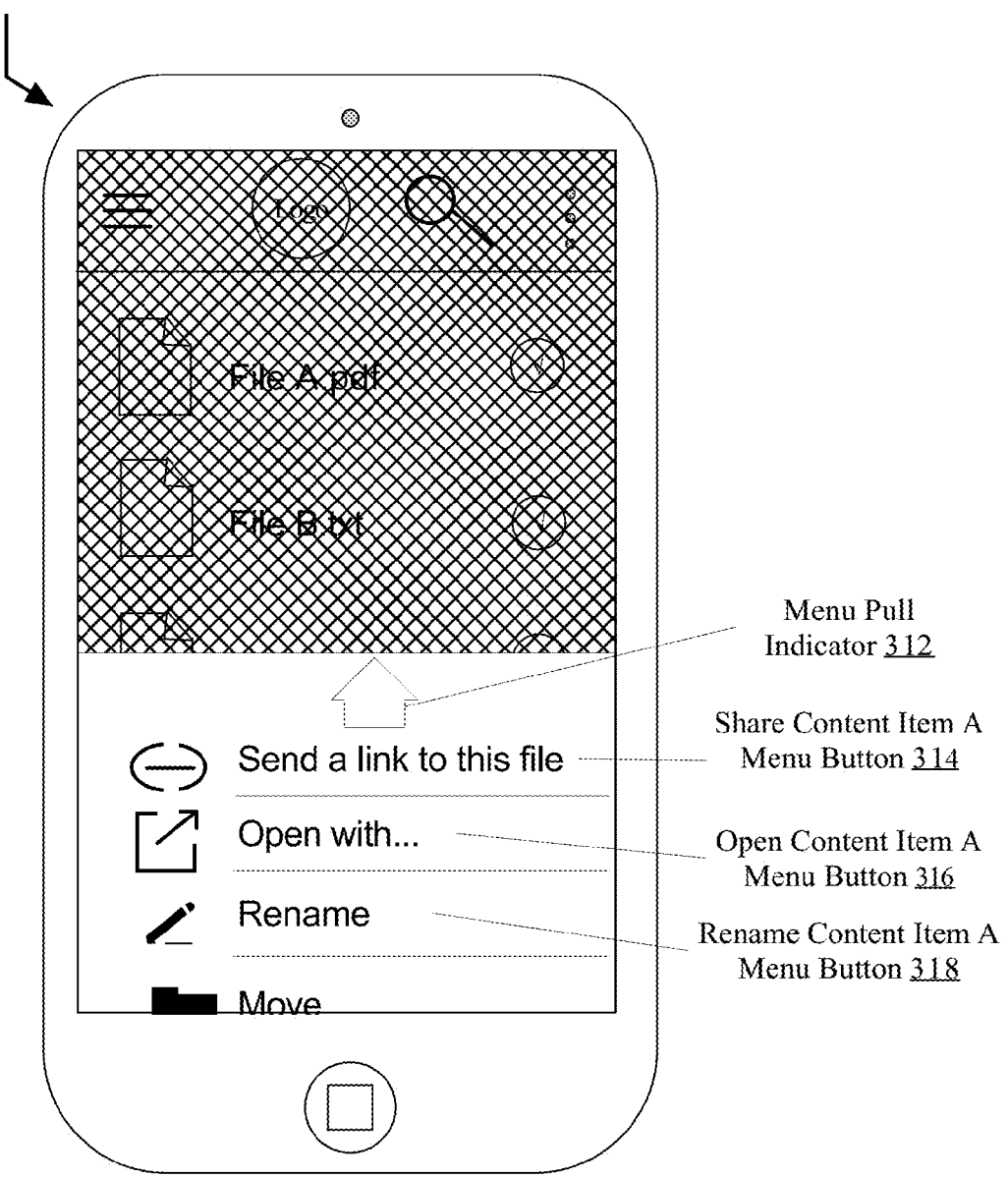
FIG. 3B is a block diagram illustrating an example user interface to share a content item.

FIG. 3B is a block diagram illustrating an example user interface to share a content item. The client device has received a selection of content item specific menu button 304, and a menu of content item specific actions is generated at the bottom of the screen. The menu includes a menu pull indicator 312, a share Content Item A menu button 314, an open Content Item A menu button 316, and a rename Content Item A menu button 318. The menu pull indicator 312 indicates the user may pull the menu higher up on the screen to view more options. The share Content Item A menu button 314 generates a link and takes the user to a custom share sheet. The open with button 316 allows the user to open the content item with a specific program, and the rename button 318 allows the user to rename the content item.

Generating and Ordering Contact-Avenue Pairs

At step 206, client device 112 generates contact-avenue pairs based on share history 130. Generating contact-avenue pairs involves parsing contacts and avenues from each record in share history 130. Additional data may also be parsed and stored with the contact-avenue pair as metadata for the ranking utility 124 to order the contact-avenue pairs. In some embodiments, a first set of avenue pairs are generated, and as more contact-avenue pairs are needed, more contact-avenue pairs are generated, as indicated by the arrow from step 208 to step 206.

Figure 2C:
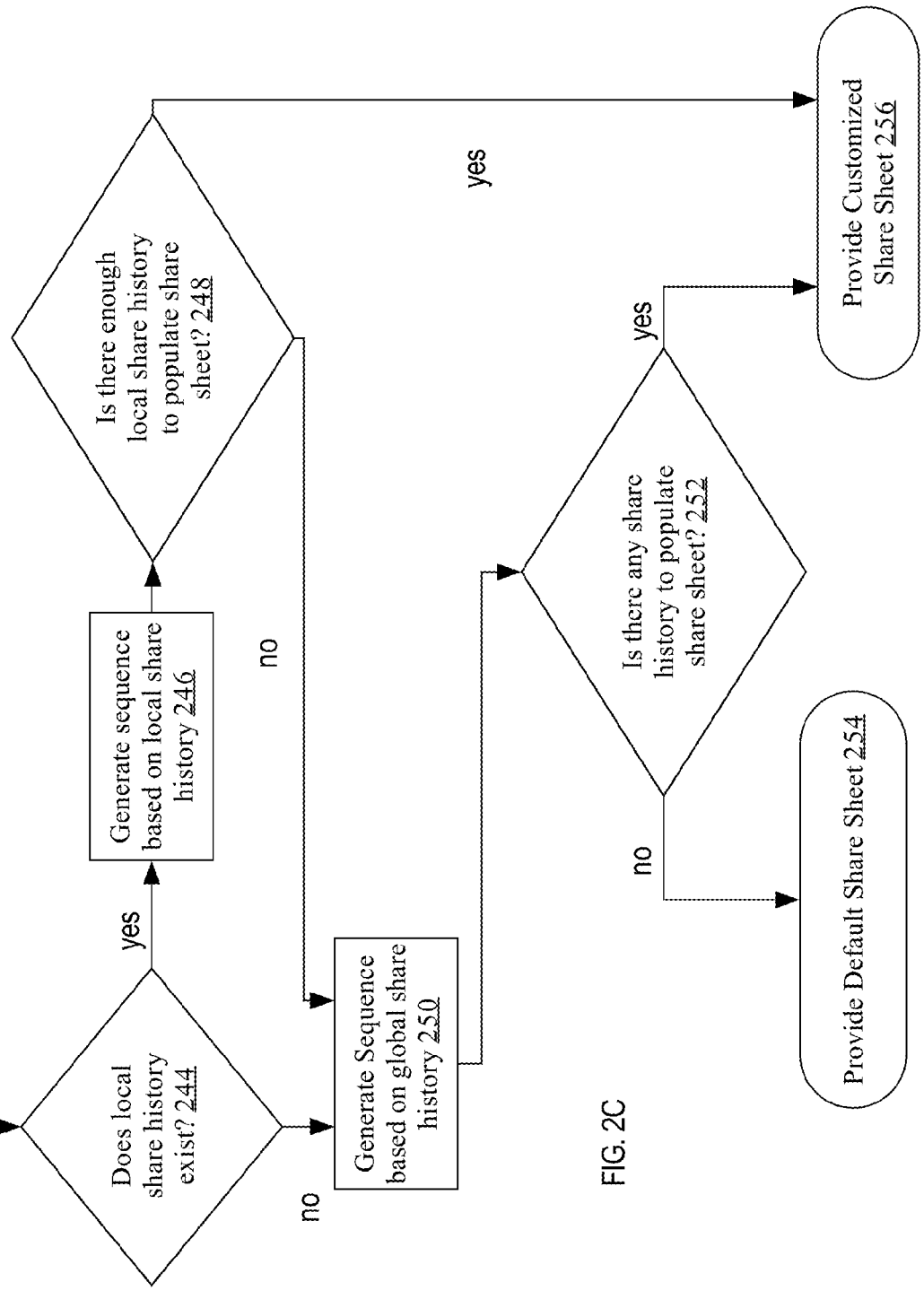
FIG. 2C is a flowchart illustrating of program flow used to generate contact-avenue pairs for a custom share sheet.

At step 208, client device 112 orders the contact-avenue pairs based on one or more algorithms using ranking utility 124. FIG. 2C is a block diagram illustrating an example program flow 240 that generates and orders contact-avenue pairs. At step 244, share history 130 is checked for records of the most recently shared content items. If local share history 222 exists, the timestamp of each record in local share history 222 is used to generate a sequence of contact-avenue pairs based on the applications and contact information that were used to share the content items most recently at step 246.

At step 248, whether enough contact-avenue pairs were generated to populate a customized share sheet is determined. In a preferred embodiment, the number of contact-avenue pairs are compared to a threshold number of available slots in the customized share sheet. If enough slots are filled, then the customized share sheet is generated with the contact-avenue pairs at step 256.

Secondary Ordering of Contact-Avenue Pairs

If there is not enough local share history 222 to populate the customized share sheet at step 248 or there is not any local share history at step 244, then at step 250 content item metadata is requested from cloud storage application 138 to generate global share history 224. The first time a user shares a content item using cloud storage application 118 is an example of when there would not be enough local share history.

In FIG. 2B, monitoring agent 122 has generated global share history 224 from content item metadata in cloud storage 140. Client device 112 stores global share history 224 in local storage 128 with share history 130. The global share history includes fields for the number of counts a particular contact has received a share, the primary contact information used, the avenue of the share and the content items that were shared. In this embodiment, the global share history 224 is stored as a table, but in alternative embodiments, the global share history may simply be stored as a log of key-value pairs.

In FIG. 2B, the data items in global share history 224 are merely an example. The actual data items may include tokens or identifiers that reference times, contacts, avenues, and content items in other tables. In some embodiments, the sharing avenues stored as global share history may comprise exclusively one type of avenue. In this embodiment, the sharing avenues of each record are generated rather pulled from the global share history. For example, a field for avenues in global share history 224 may not be necessary if the only metadata available to generate a contact-avenue pair is an email address. In this case, the "email" avenue is generated rather than pulled from global share history.

The contact-avenue pairs generated from each record are then ordered in a sequence of contact-avenue pairs based on contacts that have been given access to the most content items and folders (i.e. received the most shares). If a sequence of contact-avenue pairs has already been generated based on local share history 222, then the second sequence of contact-avenue pairs (based on the global share history) is concatenated to the first sequence of contact-avenue pairs (based on the local share history). The combined sequence of contact-avenue pairs are provided to generate a custom share sheet at step 256. The ranking utility 124 may perform deduplication before providing the contact-avenue pairs.

If there is no share history at step 252 (global or local), then at step 254 a default share sheet is provided that allows a particular user to select a particular avenue from a set of messaging services 120 that are already loaded on device 112, and then select one or more user accounts associated with that particular avenue in a two-step process.

Generating a Custom Share Sheet

Figure 3C:
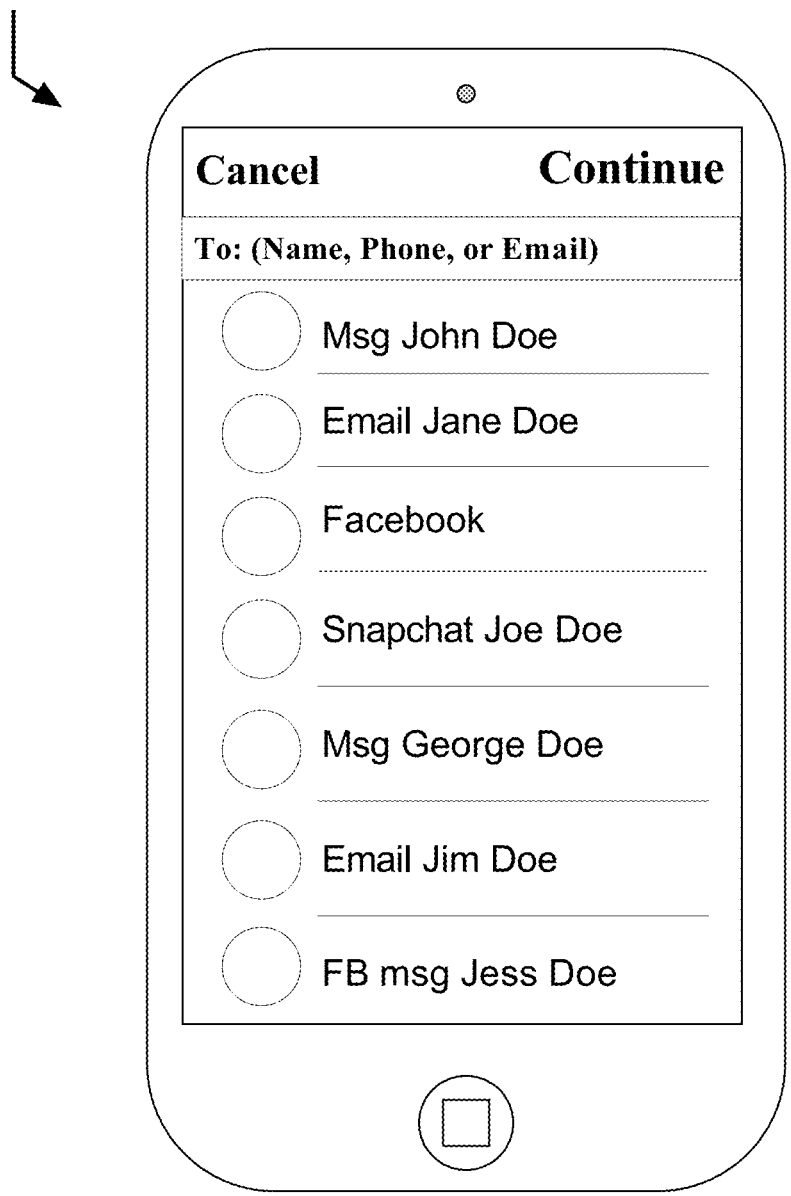
FIG. 3C is a block diagram illustrating an example user interface to select one or more contact-avenue pairs.

At step 210, client device 112 generates a customized share sheet with shortcut controls to contact-avenue pairs provided from step 256. FIG. 3C is a block diagram illustrating an example user interface to select one or more contact-avenue pairs in a list layout. This graphic user interface may be referred to herein as an embodiment of the customized share sheet. A list of shortcut controls to share the particular content item with specific contact-avenue pairs is provided. The list of shortcut controls includes text messaging John Doe, emailing Jane Doe, Facebooking, Snapchatting Joe Doe, text messaging George Doe, emailing Jim Doe, and Facebook messaging Jess Doe. The user is given the option to select one or more of the contact-avenue pairs. Alternatively, optionally, and/or additionally, the user may enter a name, phone number, email address, or account identifier at the top of the share sheet that indicates, based on the format entered and the actual data, a contact-avenue pair.

The example provided in FIG. 3C has a different contact for every shortcut control to a contact-avenue pair indicating deduplication has occurred. In some embodiments, it is preferable to not perform de-duplication based on common avenues. For example, the customize share sheet could display a shortcut control for sending an email to John Doe, and sending a text message to John Doe.

Sharing Multiple Contact-Avenue Pairs

At step 212, client device 112 receives multi-selection of a shortcut controls based on contact-avenue pairs, and sends multiple links that reference the content item selected in step 204 to the selected contacts through the selected avenues.

Figure 3D:
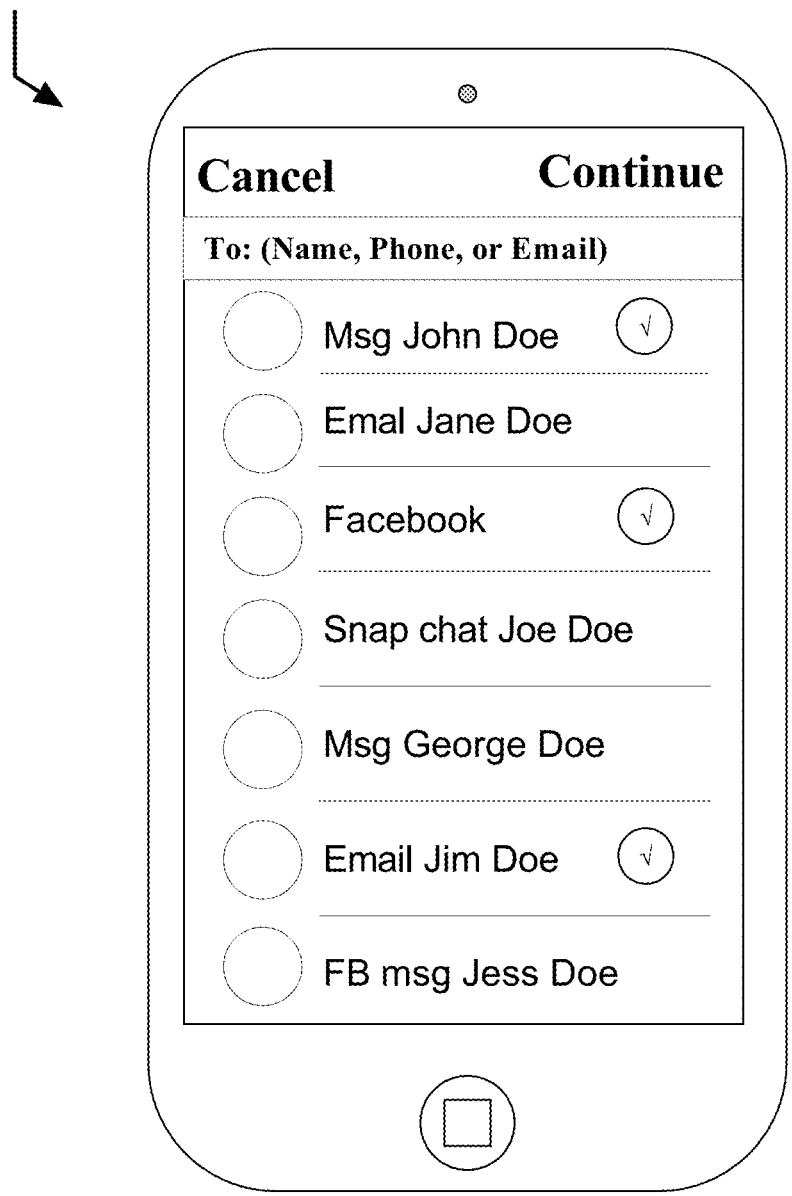
FIG. 3D is a block diagram illustrating an example user interface to confirm sending a link that references a content item to multiple contact-avenue pairs.

FIG. 3D is a block diagram illustrating an example user interface to confirm sending a link to multiple contact-avenue pairs. A selection of three contact-avenue pairs was received: message John Doe, Facebook post, and email Jim Doe. The customized share sheet then opens the applications corresponding the selected avenues in the contact-avenue pairs and sends a generated link.

Using the custom share sheet, a client device 112 may generate and send one or more links to share the same content item or content items across multiple avenues. For example, the sharing user may share Content Item A with target client 142 through avenue 150. A first link is generated and sent that grants access to Content Item A in cloud storage 140. The sharing user may also share Content Item A with target client 162 through avenue 160. A second link is generated and sent that grants access to Content Item A in cloud storage 140. The sharing user may also share Content Item A with target client 182 through avenue 170. A third link is generated and sent to the client that grants access to Content Item A in cloud storage 140. Thus, the sharing user of client device 112, the recipient of client 142, the recipient of target client device 162, and the recipient of target client device 182 have access to Content Item A.

The selected contact-avenue pairs may create additional sharing history that can be used for future contact-avenue pair rankings as indicated by the arrow between step 212 and step 202. Thus, the process is circular. Each content item that is shared creates additional share history. The share history may be stored both locally in client device 112 and globally in cloud storage 140.

Grouping Contact-Avenue Pairs in One Shortcut Control

The selected contact-avenue pairs may be also combined into a single shortcut control. Thus, the sharing history may be used to not only create single contact-avenue pair recommendations, but also to create bundled contact-avenue pair recommendations. Bundling contact-avenue pairs into one shortcut control may be difficult to view entirely in one screen. Thus, when multiple contact-avenue pairs are bundled, a graphical indication of chat-heads representing these contact-avenue pairs may be placed on top of each like a deck of cards. When a user wishes to view each contact-avenue pair in the bundle, the user can double tap the bundle to explode the representations of individual contact-avenue pairs. Alternative embodiments include listing all of the contact avenue pairs next to a single icon or representation of a group.

Alternative Implementations

Figure 4:
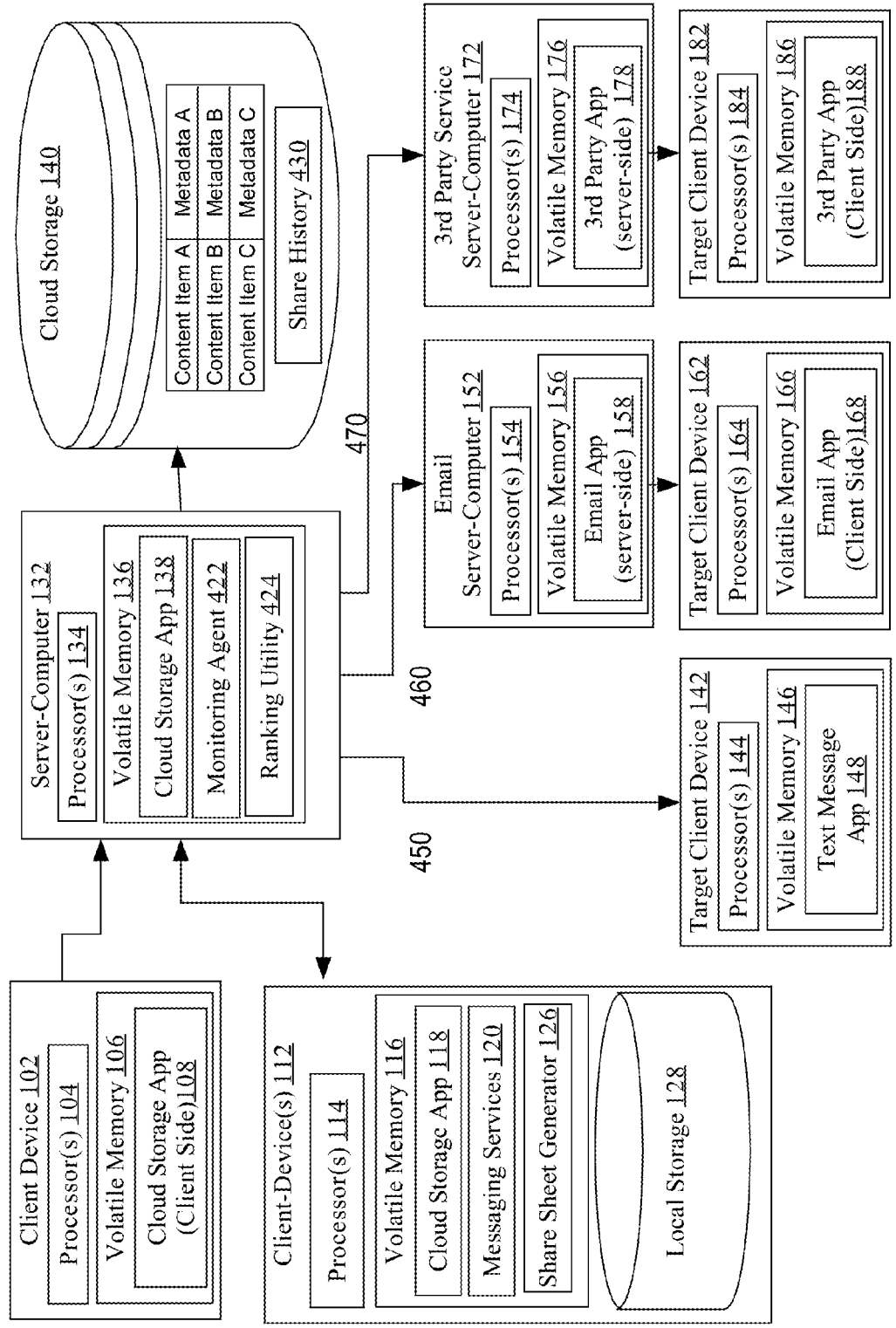
FIG. 4 is a block diagram illustrating an example system architecture configured to share content items through a server computer.

In some embodiments, contact-avenue pairs may be ordered only using global share history. Different architectures may be used to better effect this embodiment. Particularly, when sharing is performed through the server computer 132, the server side may run a monitoring agent and ranking utility. FIG. 4 is a block diagram illustrating an example embodiment of system architecture 400 with the server computer executing these programs.

When the monitoring agent 422 executes on the server computer 132, the monitoring agent 422 acts as a cross-platform sharing monitor. Thus, any device used in associated with the particular user account will create sharing history 430 in cloud storage 140. The contact-avenue pairs generated from the cross-platform information may be ordered based on the content items most recently shared, based on the contacts that receive the most shares, or based on a combination of one more ordering methods previously described herein. The cloud storage application 138 then provides the contact-avenue pairs to the cloud storage application 118 on the client, so the client device may generate a customized share sheet using the local share sheet generator 126.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
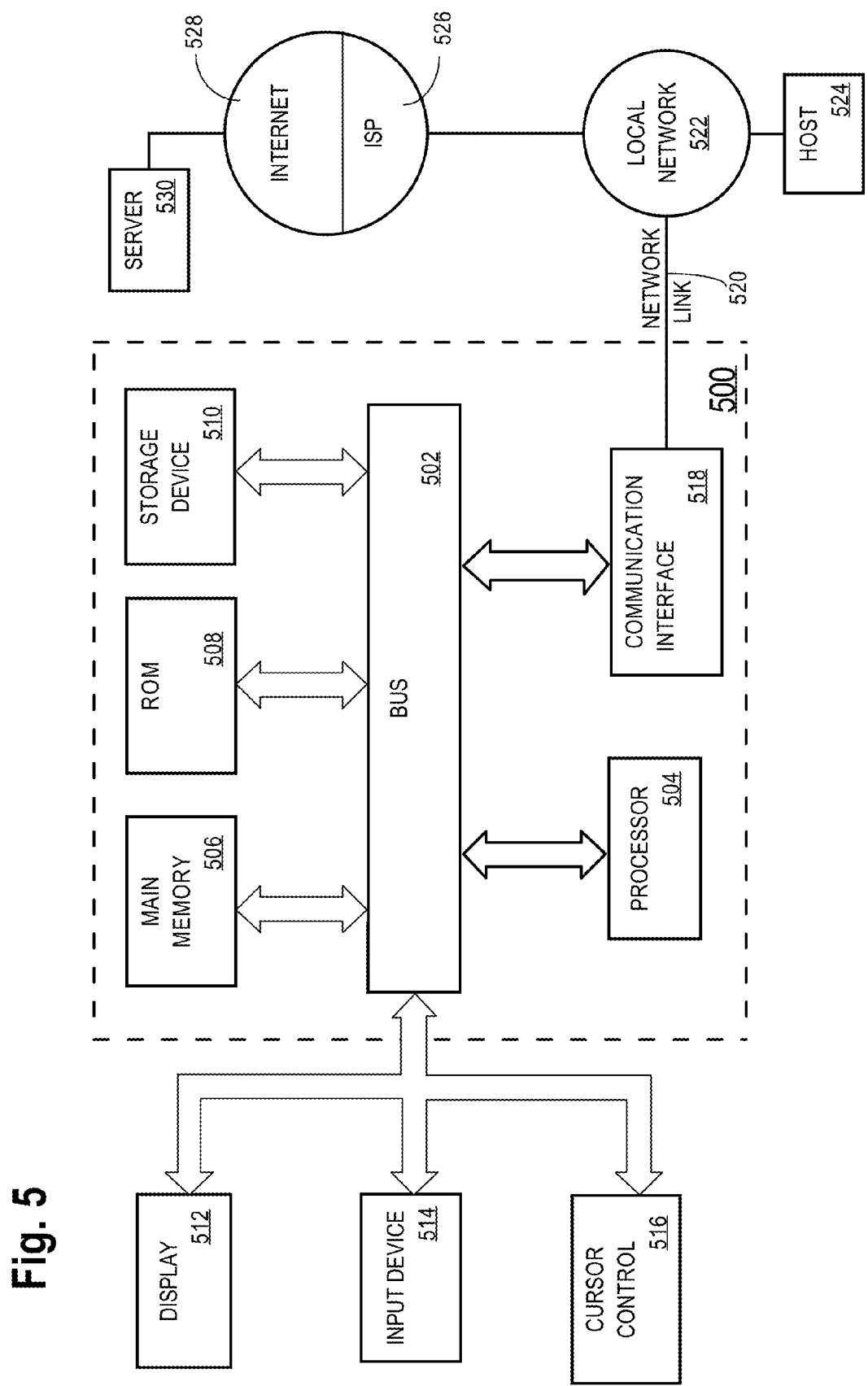
FIG. 5 is a block diagram illustrating a computer system that may be used to implement the techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    generating, at a first personal computing device, a plurality of contact-avenue pairs for a user to share a link to a content item;
    wherein the user has a user account with a cloud storage application;
    wherein the user account is associated with a plurality of personal computing devices of the user;
    wherein the plurality of personal computing devices includes the first personal computing device;
    wherein a first local content item sharing history of the user reflects one or more shares of one or more links to one or more content items by the user using the first personal computing device;
    wherein a second local content item sharing history of the user reflects one or more shares of one or more links to one or more content items by the user using a second personal computing device, of the plurality of personal computing devices associated with the user account
    wherein the cloud storage application is associated with a global content item sharing history of the user, the global content item sharing history of the user comprising the first local content item sharing history of the user and comprising the second local content item sharing history of the user, the first local content item sharing history uploaded to the cloud storage application from the first personal computing device, the second local content item sharing history uploaded to the cloud storage application from the second personal computing device;
    wherein the generating the plurality of contact-avenue pairs for the user to share the link to the content item is based on: responsive to determining that a number of contact-avenue pairs generated based on the first local content item sharing history of the user is less than a threshold number, then generating one or more contact-avenue pairs, of the plurality of contact-avenue pairs for the user to share the link to the content item, based on the global content item sharing history of the user;
    wherein each contact-avenue pair of the plurality of contact-avenue pairs includes both:
        (a) an avenue that indicates a respective link sharing mechanism for sharing the link to the content item, and
        (b) contact information for a recipient with which to share the link to the content item via the avenue;
    displaying, in a graphical user interface at the first personal computing device, a custom share sheet that provides a plurality of shortcut controls for the plurality of contact-avenue pairs;
    wherein each shortcut control of the plurality of shortcut controls is provided in the custom share sheet for a corresponding contact-avenue pair of the plurality of contact-avenue pairs;
    based on a user selection of a selected shortcut control of the plurality of shortcut controls corresponding to a particular contact-avenue pair of the plurality of contact-avenue pairs, causing the link to the content item to be shared with the recipient of the contact information of the particular contact-avenue pair via the avenue of the particular contact-avenue pair.

2. The method of claim 1, further comprising:
    using the plurality of contact-avenue pairs to generate the custom share sheet that displays two or more shortcut controls to share with two or more contact-avenue pairs, respectively, the two or more shortcut controls including selected shortcut control to share with the particular contact-avenue pair and a second shortcut control to share with a second contact-avenue pair.

3. The method of claim 2, wherein the second contact-avenue pair includes a different avenue than the particular contact-avenue pair.

4. The method of claim 2, wherein the custom share sheet is configured to receive, in a single screen, multi-selection input of multiple shortcut controls to contact-avenue pairs of the two or more contact-avenue pairs.

5. The method of claim 4, further comprising:
    based on a particular multi-selection input that selects both the shortcut control to share with the particular contact-avenue pair and the second shortcut control to share with the second contact-avenue pair, sending, to a second target contact through a second associated avenue of the second contact-avenue pair, a second link to the content item.

6. The method of claim 1, wherein at least some of the plurality of contact-avenue pairs are generated from sharing metadata created at the first personal computing device and stored locally on the first personal computing device.

7. The method of claim 1, further comprising:
    after generating the plurality of contact-avenue pairs, ranking, based on metadata, a set of contact-avenue pairs of the plurality of contact-avenue pairs in an order; and
    using the order to generate the custom share sheet that displays a shortcut control to each contact-avenue pair in the set of contact-avenue pairs in that order.

8. The method of claim 7, wherein at least a portion of the ranking prioritizes contact-avenue pairs based on content items that were shared most recently.

9. The method of claim 7, wherein at least a portion of the ranking prioritizes contact-avenue pairs based on a count tracking how many content items have been shared, by a user account of the user, with each target contact associated with the set of contact-avenue pairs.

10. The method of claim 1, further comprising:
identifying multiple contact-avenue pairs that are associated with a same target contact;
selecting a first contact-avenue pair of the multiple contact-avenue pairs; and
in response to selecting, generating the custom share sheet with the first contact-avenue pair but not a second contact-avenue pair of the multiple contact-avenue pairs.

11. One or more non-transitory computer-readable media storing instructions, said instructions, which, when executed by one or more hardware processors, cause:
generating, at a first personal computing device, a plurality of contact-avenue pairs for a user to share a link to a content item;
wherein the user has a user account with a cloud storage application;
wherein the user account is associated with a plurality of personal computing devices of the user;
wherein the plurality of personal computing devices includes the first personal computing device;
wherein a first local content item sharing history of the user reflects one or more shares of one or more links to one or more content items by the user using the first personal computing device;
wherein a second local content item sharing history of the user reflects one or more shares of one or more links to one or more content items by the user using a second personal computing device, of the plurality of personal computing devices associated with the user account;
wherein the cloud storage application is associated with a global content item sharing history of the user, the global content item sharing history of the user comprising the first local content item sharing history of the user and comprising the second local content item sharing history of the user, the first local content item sharing history uploaded to the cloud storage application from the first personal computing device, the second local content item sharing history uploaded to the cloud storage application from the second personal computing device;
wherein the generating the plurality of contact-avenue pairs for the user to share the link to the content item is based on: responsive to determining that a number of contact-avenue pairs generated based on the first local content item sharing history of the user is less than a threshold number, then generating one or more contact-avenue pairs, of the plurality of contact-avenue pairs for the user to share the link to the content item, based on the global content item sharing history of the user;
wherein each contact-avenue pair of the plurality of contact-avenue pairs includes both:
(a) an avenue that indicates a respective link sharing mechanism for sharing the link to the content item, and
(b) contact information for a recipient with which to share the link to the content item via the avenue;
displaying, in a graphical user interface at the first personal computing device, a custom share sheet that provides a plurality of shortcut controls for the plurality of contact-avenue pairs;
wherein each shortcut control of the plurality of shortcut controls is provided in the custom share sheet for a corresponding contact-avenue pair of the plurality of contact-avenue pairs;
based on a user selection of a selected shortcut control of the plurality of shortcut controls corresponding to a particular contact-avenue pair of the plurality of contact-avenue pairs, causing the link to the content item to be shared with the recipient of the contact information of the particular contact-avenue pair via the avenue of the particular contact-avenue pair.

12. The one or more non-transitory computer-readable media of claim 11, storing instructions, which, when executed by one or more hardware processors, further cause:
using the plurality of contact-avenue pairs to generate the custom share sheet that displays two or more shortcut controls to share with two or more contact-avenue pairs, respectively, the two or more shortcut controls including selected shortcut control to share with the particular contact-avenue pair and a second shortcut control to share with a second contact-avenue pair.

13. The one or more non-transitory computer-readable media of claim 12, wherein the second contact-avenue pair includes a different avenue than the particular contact-avenue pair.

14. The one or more non-transitory computer-readable media of claim 12, wherein the custom share sheet is configured to receive, in a single screen, multi-selection input of multiple shortcut controls to contact-avenue pairs of the two or more contact-avenue pairs.

15. A computing system comprising:
one or more processors;
storage media; and
one or more programs stored in the storage media for execution by the one or more processors, the one or more programs comprising instructions configured for:
generating, at a first personal computing device, a plurality of contact-avenue pairs for a user to share a link to a content item;
wherein the user has a user account with a cloud storage application;
wherein the user account is associated with a plurality of personal computing devices of the user;
wherein the plurality of personal computing devices includes the first personal computing device;
wherein a first local content item sharing history of the user reflects one or more shares of one or more links to one or more content items by the user using the first personal computing device;
wherein a second local content item sharing history of the user reflects one or more shares of one or more links to one or more content items by the user using a second personal computing device, of the plurality of personal computing devices associated with the user account;
wherein the cloud storage application is associated with a global content item sharing history of the user, the global content item sharing history of the user comprising the first local content item sharing history of the user and comprising the second local content item sharing history of the user, the first local content item sharing history uploaded to the cloud storage application from the first personal computing device, the second local content item sharing history uploaded to the cloud storage application from the second personal computing device;
wherein the generating the plurality of contact-avenue pairs for the user to share the link to the content item is based on: responsive to determining that a number of contact-avenue pairs generated based on the first local content item sharing history of the user is less than a threshold number, then generating one or more contact-avenue pairs, of the plurality of contact-avenue pairs for the user to share the link to the content item, based on the global content item sharing history of the user;
wherein each contact-avenue pair of the plurality of contact-avenue pairs includes both:
 (a) an avenue that indicates a respective link sharing mechanism for sharing the link to the content item, and
 (b) contact information for a recipient with which to share the link to the content item via the avenue;
displaying, in a graphical user interface at the first personal computing device, a custom share sheet that provides a plurality of shortcut controls for the plurality of contact-avenue pairs;
wherein each shortcut control of the plurality of shortcut controls is provided in the custom share sheet for a corresponding contact-avenue pair of the plurality of contact-avenue pairs;
based on a user selection of a selected shortcut control of the plurality of shortcut controls corresponding to a particular contact-avenue pair of the plurality of contact-avenue pairs, causing the link to the content item to be shared with the recipient of the contact information of the particular contact-avenue pair via the avenue of the particular contact-avenue pair.

16. The computing system of claim 15, the instructions further configured for:
using the plurality of contact-avenue pairs to generate the custom share sheet that displays two or more shortcut controls to share with two or more contact-avenue pairs, respectively, the two or more shortcut controls including selected shortcut control to share with the particular contact-avenue pair and a second shortcut control to share with a second contact-avenue pair.

17. The computing system of claim 16, wherein the second contact-avenue pair includes a different avenue than the particular contact-avenue pair.

* * * * *